United States Patent
Manson

[19]

[11] Patent Number: 5,975,003
[45] Date of Patent: Nov. 2, 1999

[54] SMALL WATERCRAFT BOW PORTAGE ACCESSORY

[76] Inventor: Dale Manson, 17875 Reeds Creek Rd., Red Bluff, Calif. 96080

[21] Appl. No.: 09/205,793

[22] Filed: Dec. 4, 1998

[51] Int. Cl.$^6$ ....................................................... B60P 3/10
[52] U.S. Cl. .................. 114/344; 280/414.2; 280/47.131
[58] Field of Search ..................................... 114/343, 344; 280/47.131, 414.2

[56] References Cited

U.S. PATENT DOCUMENTS

| | | | |
|---|---|---|---|
| 1,109,520 | 9/1914 | Flower | 114/344 |
| 3,567,241 | 3/1971 | Foschino | 280/414 |
| 3,687,476 | 8/1972 | Abbott | 280/47.32 |
| 4,059,282 | 11/1977 | Prickett | 280/47.13 |
| 4,300,252 | 11/1981 | Montooth . | |
| 4,392,665 | 7/1983 | Miller et al. | 114/344 |
| 4,422,665 | 12/1983 | Hinnant | 114/344 |
| 4,936,595 | 6/1990 | Cunningham | 114/344 |
| 5,203,580 | 4/1993 | Cunningham | 280/47.331 |
| 5,791,279 | 8/1998 | Hart | 114/344 |

Primary Examiner—Jesus D. Sotelo
Attorney, Agent, or Firm—Graybeal Jackson Haley LLP

[57] ABSTRACT

A bow accessory for assisting a user in small water craft portage activities is described. The accessory includes a pair of struts that are removably and rotationally linked to a pair of gunwale adapters that engage the watercraft gunwales. The struts converge towards a wheel assembly that includes a keel chock. When rotated into a portage position, the watercraft keel rests in the chock and the weight of the watercraft bow portion is supported thereby. A feature of the invention permits the user to adjust the relative angle of the wheel assembly so that appropriate alignment with the ground can be made. When the wheel assembly is rotated towards the bow of the watercraft and into a stowed position, the wheel assembly and major portions of the struts are disposed below the gunwales and may reside in the watercraft bilge area. Alternatively, the struts may be conveniently removed from the gunwale adapters and stowed separately. To facilitate convenient engagement and disengagement of the major portions of the accessory from the gunwales, each adapter has a slotted flange to receive a cross member joining the upper portions of the struts. A hasp rotationally linked to the flange ensures that the assembly is not accidentally disengaged. Several embodiments of gunwale adapters as well as strut configurations are disclosed in addition to the basic embodiment.

15 Claims, 5 Drawing Sheets

SMALL WATERCRAFT BOW PORTAGE ACCESSORY

FIELD OF THE INVENTION

The present invention relates to a wheeled accessory for small watercraft to facilitate transportation of the watercraft on land. In particular, the invention relates to a bow mounted strut and wheel combination that elevates the bow keel of such watercraft above ground and provides for convenient stowage of the assembly when the craft is in the water.

BACKGROUND OF THE INVENTION

The use of wheeled accessories to assist in moving a watercraft over land is quite old. The most common accessory is a trailer wherein the watercraft is cradled by the trailer and moved, either by mechanical assistance or by human power, to a desired location. However, where small watercraft are involved, particularly dinghies, it is not necessary to have a trailer as the weight of such craft are generally less than 300 pounds. While it may be possible for many users of such craft to carry or drag it to a desired location, if the distance involved is far or the user does not desire to do so, it become impracticable to carry or drag the craft. Thus, wheeled assistance of some form is necessary.

With respect to dinghies, a common transportation scenario involves the user loading the dinghy atop a transportation vehicle such as a camper or in a pickup truck bed, transporting the dinghy to the desired launch location, removing the dinghy from the transportation vehicle, and moving by hand the dinghy to the launch ramp or shore. It is during this last step that many users become frustrated due to the difficulty in moving the dinghy by hand to the ramp or shore. In view of this difficulty, several solutions have been proposed. Since dinghies such as row boats or the like are not sensitive to speed issues, boat drag is of only slight concern. Therefore, proposed solutions include the attachment of wheels to the stern transom section of the boat. These wheels extend past the bottom hull portion of the dinghy and may be removable from brackets affixed thereon or may be permanently attached thereto. The user is then required to elevate the bow of the dinghy and pull it to the desired location, with the transom wheels supporting the stern of the craft.

Obviously, the foregoing solution is not without drawbacks. The primary drawback is that the user must still elevate the bow portion of the dinghy in order to transport it. Thus, the user is required to elevate the craft and propel the craft. In view of this drawback, prior efforts have focused on providing for a bow wheeled support assembly. Examples of these efforts can be found in U.S. Pat. Nos. 1,109,520, 3,567,241, 3,687,476, and 5,203,580. As early as 1914, solutions have been proposed that relied on a dolly approach to address the noted drawbacks. For example, many of the referenced patents rely on a dolly type approach wherein the weight of the dinghy is directed exclusively to the wheel and gunwale supports is used for alignment and securement of the dolly, e.g., U.S. Pat. Nos. 3,567,241, 3,687,476, and 5,203,580. Referring to the noted patents, this class of dolly wheeling device must be installed and removed for transportation and use of the craft.

An alternative design relies on using the gunwale supports as a weight bearing member. This approach is best shown in U.S. Pat. No. 1,109,520. With this invention, a fulcrum support is made by having the keel support act as a fulcrum point with the wheel and the gunwale being the extended load supports. In the '520 invention, the body supports are loosely fitted to the gunwales and extend forwardly and exteriorly of the boat sides. A keel supporting cross member links the two supports as does a wheel axle located near the end of the supports. When the keel rests upon the cross member and the weight of the boat supported by the wheel, the supports are compressively held against the gunwales. However, as with the dolly type inventions, the '520 invention must be removed after use and stored somewhere.

It is therefore apparent that a wheeled type portage accessory is needed that can be easily used to support the bow of a dinghy or like watercraft, easily stowed when not in use, and simple to manufacture and use. In view of these objectives, the following invention was made.

SUMMARY OF THE INVENTION

The present invention relates to a small watercraft bow portage accessory comprising two struts each having a first end and a second end; a first and a second gunwale adapter wherein the first gunwale adapter is rotatably linkable to the first strut at the first end and the second gunwale adapter is rotatably linkable to the second strut at the first end whereby the first and second struts are rotatably linked to the watercraft when the first and second gunwale adapters are attached to the watercraft; and a wheel assembly joining the second end of both the first and the second strut whereby the keel of the watercraft is supported by the wheel assembly when the accessory is in a portage position. In this manner, the accessory can be rotated so as to cradle the keel when it is desired to transport the watercraft over land, and rotated so that the wheel assembly and significant portions of the struts are below the gunwales during use of the watercraft as intended.

In a preferred embodiment, a cross member serves to join the first ends of the struts to provide desirable rigidity to the accessory and convenient means for engaging the gunwale adapters in a rotatable fashion. The adapters used to secure the main structure of the invention to the watercraft gunwales each have a clamping member that engages the gunwales and a flange portion that receives the cross member, although a conventional bolt and nut combination or other similar rotatably fastening system may be used to secure each strut to a respective strut. Preferably, the cross member receiving flange is oriented so that the flange opening, whether slot or hole, is perpendicular to the watercraft keel, thus facilitating easy rotation of the main structure.

The wheel assembly of the preferred embodiment utilizes a caster-type wheel, thereby permitting omni-directional movement of the bow during portage. Selection of the type of wheel is generally made in anticipation of the type of terrain that is likely to be encountered, e.g., a pneumatic wheel for rocky or loose terrain and a solid wheel for smooth and hard terrain. It is also desirable to provide for a keel chock so that the watercraft keel can firmly rest thereon during portage activities. While the location of the keel chock maybe provided at any point between the two struts, a convenient and preferred location is at the second end where the wheel assembly is located.

These and other features of the invention will become apparent upon inspection of the several drawings and review of the following detailed description.

DETAILED DESCRIPTION OF THE INVENTION

Figure 1:
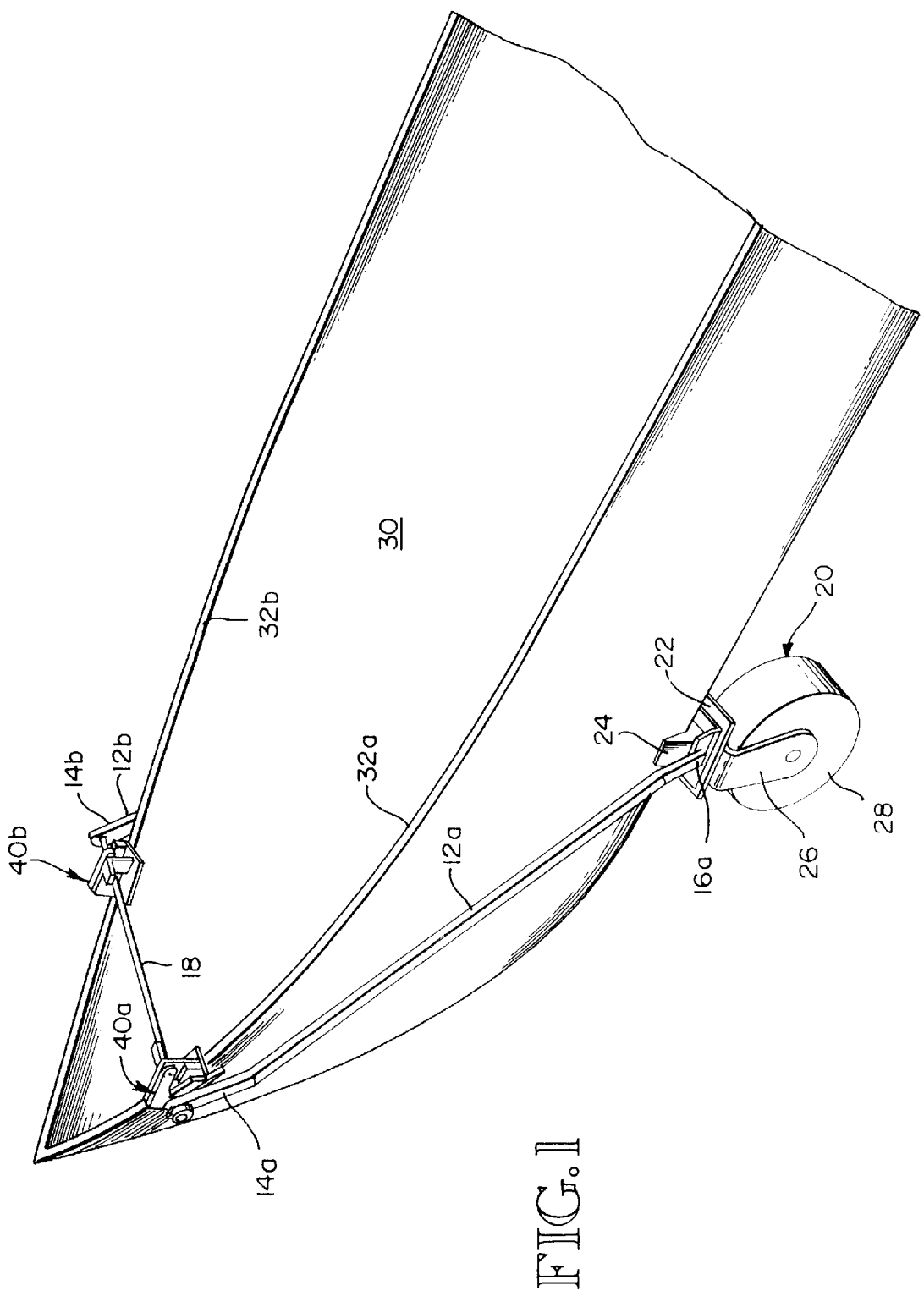
FIG. 1 is a perspective view of a preferred embodiment of the bow portage accessory shown installed on the bow portion of a dinghy ready for portage.

Turning then to the several drawings wherein like numerals indicate like parts, and more particularly to FIG. 1, the overall nature of bow portage assembly 10 is shown installed on gunwales 32a and 32b of dinghy 30. Assembly 10 comprises in preferred form struts 12a and 12b, cross member 18, and wheel assembly 20. Strut 12a has gunwale end 14a and wheel end 16a; strut 12b has gunwale end 14b and wheel end 16b (not shown in this FIG.). Each strut 12 is preferably constructed from aluminum bar stock material, and formed to have a bend therein proximate to the gunwale end 14 so that the struts converge towards their wheel ends 16 as shown in the drawings. A second bend proximate to the struts' wheel ends reorients the struts so that wheel ends 16 are generally parallel to one another, thereby facilitating attachment of wheel assembly 20.

Wheel assembly 20 comprises platform 22 upon which keel chock 24 is affixed. Keel chock 24 is preferably constructed from a high density rubber or polymer material, but may also be constructed from wood or metal with an appropriate protective surface disposed thereon. Platform 22 also has bracket 26 rotatably attached thereto. In conjunction with wheel 28, a caster wheel configuration is achieved so that the user may move dinghy 30 in any direction with the least amount of rolling resistance possible. Wheel 28 may be solid or pneumatic in nature, depending upon design considerations and areas of anticipated use (pneumatic being desirable for variable surfaces such as rocky shorelines or deep sand). To permit appropriate versatility of the invention, struts 12a and 12b are preferably rotatably attached to wheel assembly 20 to accommodate boats of various drafts and hull configurations, and still retain proper chock alignment.

Figure 2:
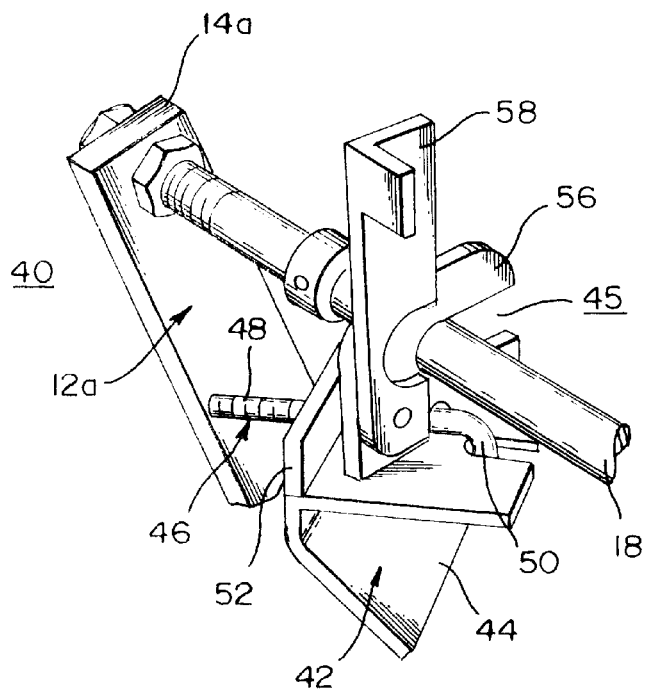
FIG. 2 is perspective view of a first gunwale adapter embodiment shown partially engaged with a portion of the accessory shown in FIG. 1.
Figure 3:
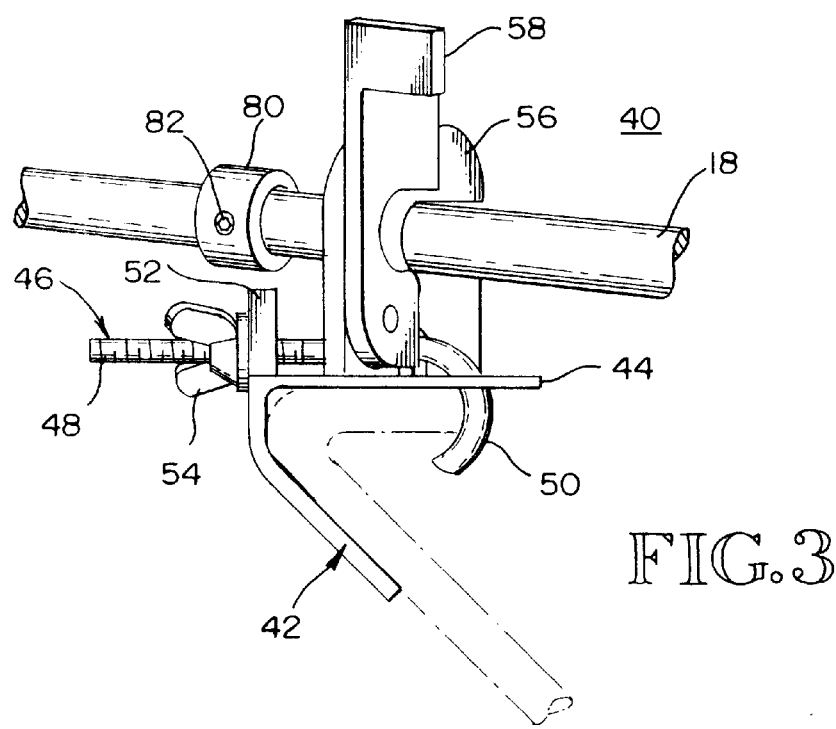
FIG. 3 is a perspective view of the adapter of FIG. 2 shown installed on the gunwale of a dinghy with the safety keeper in the open position.

Each strut 12a and 12b is preferably rotatably attachable to gunwales 32a and 32b of dinghy 30 as shown in FIG. 1. While it is not necessary to the operation of the invention, it is desirable to use cross member 18. Cross member 18 not only provides a convenient means to attach struts 12a and 12b to dinghy 30, but also provide desirable stiffness to the assembly, both when in use and during engagement/disengagement. Moreover, by using cross member 18 as the rotation means, gunwale adapters 40 can be positioned anywhere from the bow to well aft thereof, and not require the user to modify the shape of struts 12a and 12b to accommodate the differing beam width. As best shown in FIGS. 2 and 3, collar 80, having set screw 82 threadably engaged therewith, prevents unintended lateral or beam movement of struts 12a and 12b.

To provide appropriate means for attaching struts 12a and 12b, with or without cross member 18, a pair of gunwale adapters 40 are utilized. Again referring to FIGS. 2 and 3, a first embodiment of such adapters is shown. Each adapter 40 has clamping member 42 that includes bracket 44 and threaded hook 46. Bracket 44 further includes tab 52 through which threaded portion 48 extends. Hook 46 is held captive in tab 52 by way of wing nut fastener 54. Slot 45 is formed in upper portion of bracket 44 so that gunwales of various inboard length can be accommodated. Thus, as shown best in FIG. 3, adapter 40 can be used in conjunction with a dinghy having relatively little inboard gunwale length since all surface area thereof is in contact with bracket 44, yet hook portion 50 can be brought to bear there against by occupying a portion of slot 45. Naturally, gunwales having an inboard length greater than the horizontal portion of bracket 44 can also be accommodated whereby hook portion 50 does not occupy slot 45.

Gunwale adapter 40 also includes slotted flange 56, which functions to receive cross member 18 as shown. Slotted flange 56 is preferably substantially parallel with respect to the keel-line of the dinghy so that cross member 18 can be easily engaged and disengaged with the adapters. Retaining hasp 58 is rotatably attached to flange 56 to retain cross member 18 after engagement thereof. A benefit of the present configuration is that all components of the invention, except the adapters, can be easily removed by the user. Reinstallation is then accomplished by simply locating cross member 18 into slotted flanges 58 and rotating hasps 58 to the closed position. There is no need to remove or install adapters 40 unless it is desirable to use the invention in a different watercraft. While it is not necessary to use a slotted flange, for example a flange having a hole would also achieve the rotational attachment objective, such use facilitates convenient engagement and disengagement of the major assembly of the invention.

Figure 4:
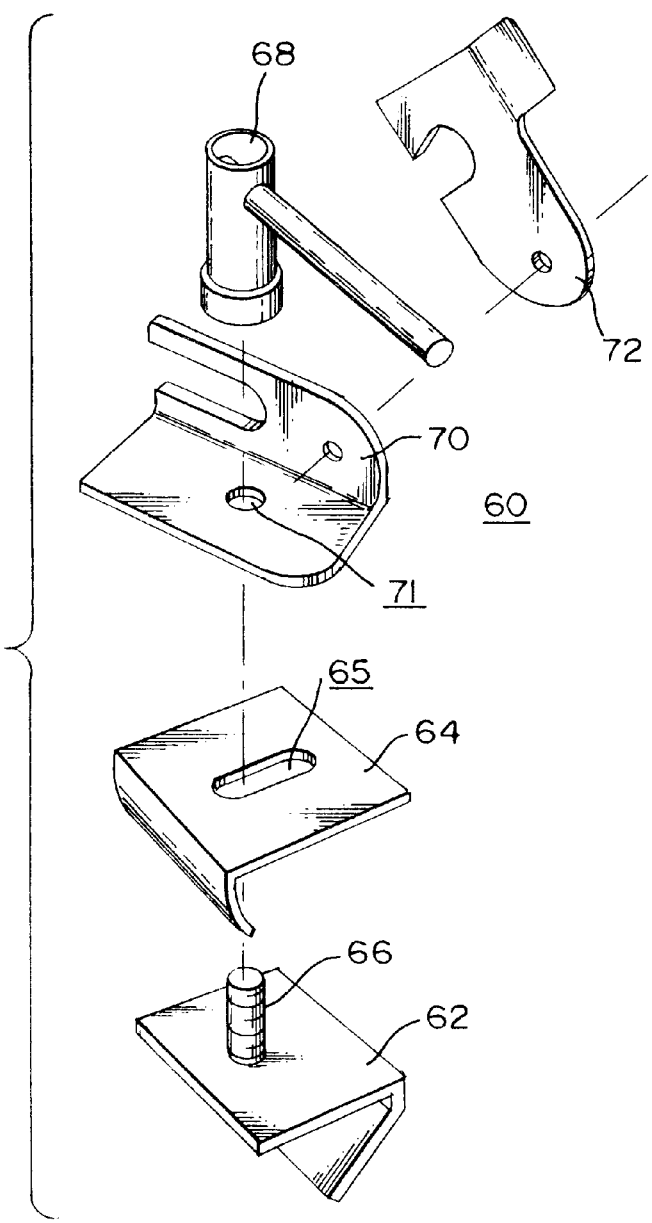
FIG. 4 is an exploded perspective view of a second gunwale adapter embodiment.
Figure 5:
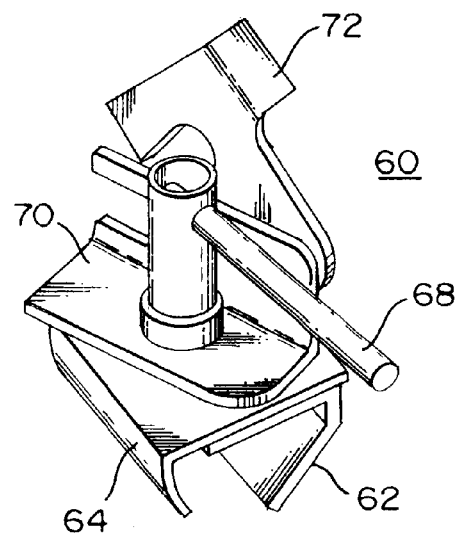
FIG. 5 is a perspective view of the adapter of FIG. 4.

FIGS. 4 and 5 illustrate a second gunwale adapter configuration. Gunwale adapter 60 includes a clamping member having lower gunwale bracket 62, which includes stud 66, and upper gunwale bracket 64, which defines closed slot 65. Also part of adapter 60 are slotted flange 70, which includes hole 71, and hasp 72, which is rotatably attached to flange 70. Threaded fastener 68 retains all components together when installed as shown in FIG. 5. Gunwales of various inboard length can be accommodated by adapter 60 by sliding upper bracket 64 relative to lower bracket 62 and then compressing the adapter by way of fastener 68. Moreover, a greater degree of alignment flexibility is achieved by use of adapter 60 over adapter 40 since the relative position of slotted flange 70 can be altered by rotation of the same with respect to lower bracket 62 and upper bracket 64. Consequently, adapter 60 can be mounted near the convergence of a dinghy's gunwales or near its beam and still retain proper slotted flange alignment with the vessel's keel.

Figure 6:
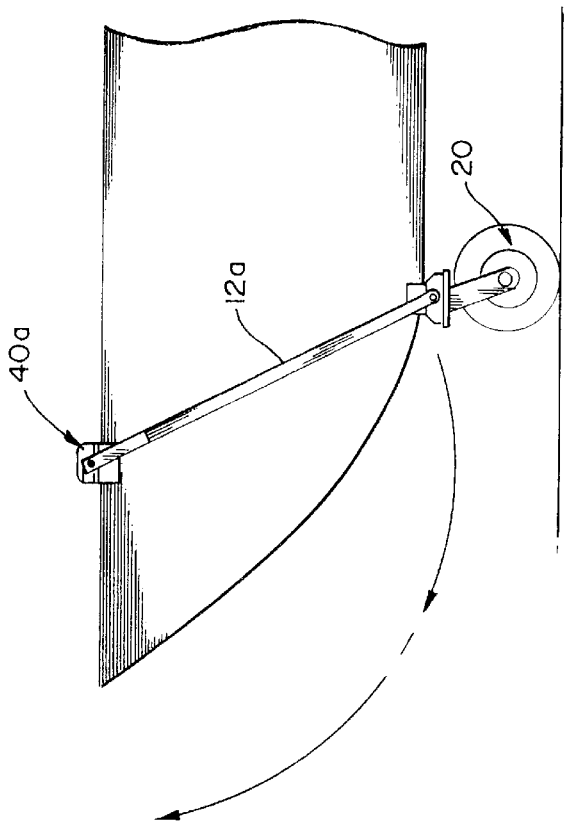
FIG. 6 is a side elevation view of the accessory shown in FIG. 1 with an arrow indicating the rotation of the invention to a stowed state.
Figure 7:
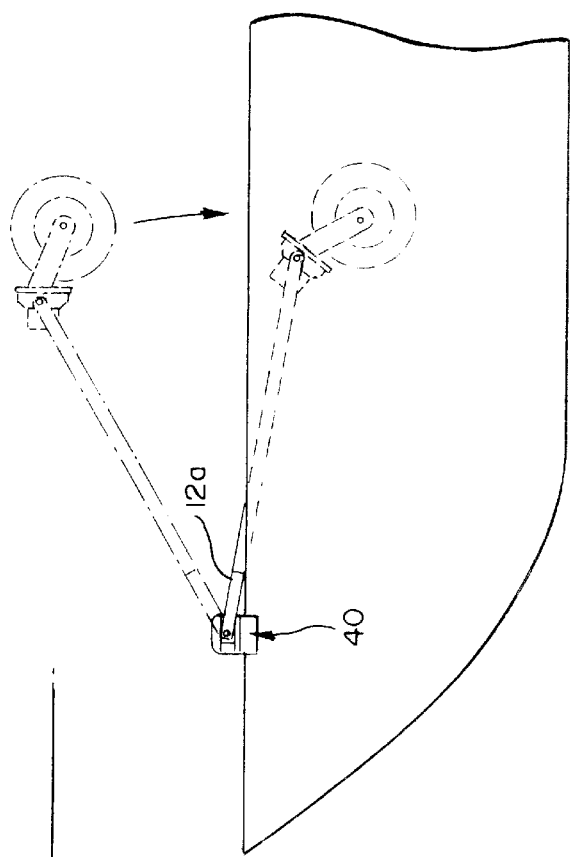
FIG. 7 shows the position of the invention when rotated into a stowed state from the position shown in FIG. 6.
Figure 8:
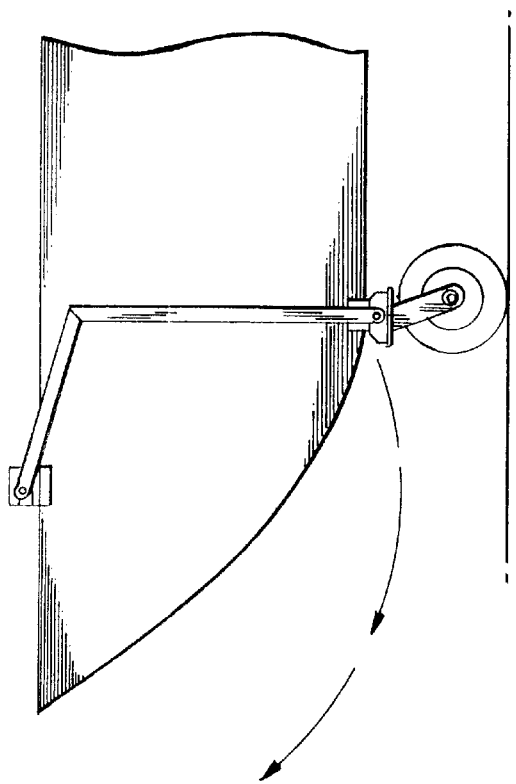
FIG. 8 is a side elevation view of a modified accessory similar to that shown in FIG. 6 but wherein a forward rake is incorporated into the struts to facilitate stowage of the invention.
Figure 9:
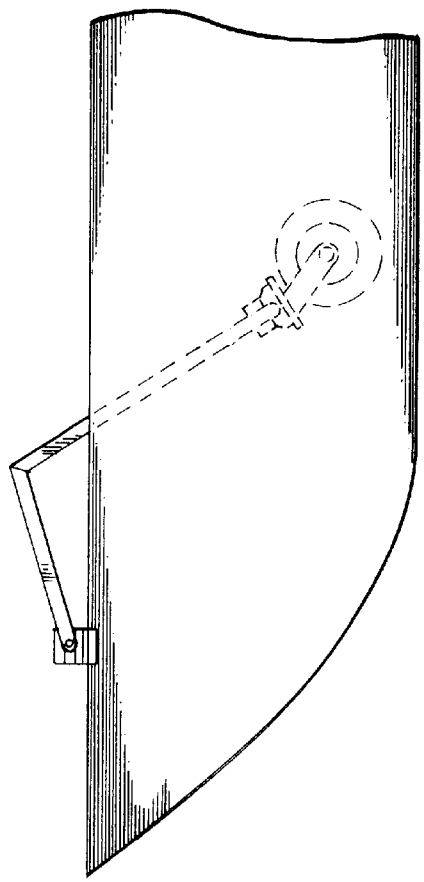
FIG. 9 shows the position of the modified accessory of FIG. 8 as it is rotated into a stowed state.

A significant improvement that the invention offers over the prior art is its ability to easily stow after use. As best shown in FIGS. 6 and 7, after use portage accessory 10 can be rotated from the position shown in FIG. 6 to the position shown in FIG. 7. An alternative configuration of struts 12a and 12b is shown in FIGS. 8 and 9. Here, struts 12a and 12b are formed to have a forward rake, thereby permitting wheel assembly 20 and a majority of struts 12a and 12b to rest in the bilge area of the dinghy. As with the embodiment shown in FIGS. 1–7, the alternative embodiment can accommodate various drafts by rotating the assembly until the keel contacts keel chock 24. In the embodiment illustrated in FIGS. 8 and 9, a maximum draft dinghy 30 is shown.

What is claimed:

1. A small watercraft bow portage accessory comprising:
   a first and a second strut, each strut having a first end and a second end;
   a first and a second gunwale adapter wherein the first gunwale adapter is rotatably linkable to the first strut at the first end and the second gunwale adapter is rotatably linkable to the second strut at the first end whereby the first and second struts are rotatably linked to the watercraft when the first and second gunwale adapters are engaged with the gunwales of the watercraft; and
   a wheel assembly joining the second end of both the first strut and the second strut.

2. The accessory of claim 1 wherein the first and the second gunwale adapters comprise a gunwale clamping member and a shaft receiving portion wherein each gunwale adapter is rotatably linkable to a respective strut at its first end by a shaft engaged therewith.

3. The accessory of claim 2 wherein the clamping member comprises an angular bracket having a side and a top portion and a tab defining a hole, and a hook-shaped fastener extending through the hole wherein a hook portion is adapted to engage the watercraft gunwale.

4. The accessory of claim 2 wherein the clamping member comprises a first angular flange and a second angular flange wherein the first angular flange has a top portion defining a hole through which extends a stud and the second angular flange has a top portion defining an orifice through which the stud may pass when the second flange is engaged with the first flange, and a fastener adapted to matingly engage with the stud so as to compressively bear down on the first and the second flanges when manipulated by a user.

5. The accessory of claim 1 wherein the wheel assembly includes a chock for receiving a keel portion of the watercraft when positioned in a portage mode.

6. The accessory of claim 1 wherein a cross member links the first end of the first strut to the first end of the second strut and wherein the first and the second gunwale adapters are rotatably linkable to the cross member.

7. The accessory of claim 6 wherein at least a portion of the cross member has a circular cross section and where in the first and the second gunwale adapters comprise a gunwale clamping member and a cross member receiving portion wherein each gunwale adapter is rotatably linkable to the cross member at the circular cross section portion thereof.

8. The accessory of claim 1 wherein the distance between the first ends of the first and second struts is greater than the distance between the second ends of the first and second struts, thereby defining a convergence of the first and second struts toward their respective second ends.

9. The accessory of claim 1 wherein the first and second struts have a rake formed therein whereby when the accessory is mounted and positioned on the watercraft, the point of contact between the watercraft and the wheel assembly is further aft than the point of contact between the gunwale adapters and the watercraft.

10. A small watercraft bow portage accessory comprising:
    a first and a second strut, each strut having a first end and a second end;
    a cross member connecting the first end of the first strut to the first end of the second strut;
    a first and a second gunwale adapter each comprising a gunwale clamping member and a cross member receiving portion wherein each gunwale adapter is rotatably linkable to the cross member; and
    a wheel assembly joining the second end of both the first strut and the second strut.

11. The accessory of claim 10 wherein the clamping member comprises an angular bracket having a side and a top portion and a tab defining a hole, and a hook-shaped fastener extending through the hole wherein a hook portion is adapted to engage the watercraft gunwale.

12. The accessory of claim 10 wherein the clamping member comprises a first angular flange and a second angular flange wherein the first angular flange has a top portion defining a hole through which extends a stud and the second angular flange has a top portion defining an orifice through which the stud may pass when the second flange is engaged with the first flange, and a fastener adapted to matingly engage with the stud so as to compressively bear down on the first and the second flanges when manipulated by a user.

13. The accessory of claim 10 wherein the wheel assembly includes a chock for receiving a keel portion of the watercraft when positioned in a portage mode.

14. The accessory of claim 10 wherein the distance between the first ends of the first and second struts is greater than the distance between the second ends of the first and second struts, thereby defining a convergence of the first and second struts toward their respective second ends.

15. The accessory of claim 10 wherein the first and second struts have a rake formed therein whereby when the accessory is mounted and positioned on the watercraft, the point of contact between the watercraft and the wheel assembly is further aft than the point of contact between the gunwale adapters and the watercraft.

* * * * *